United States Patent [19]

Bjorn

[11] Patent Number: 4,732,034

[45] Date of Patent: Mar. 22, 1988

[54] TACHOMETER KIT WITH ALTERNATOR PICK UP

[75] Inventor: Thomas E. Bjorn, Northbrook, Ill.

[73] Assignee: Stewart-Warner Corporation, Chicago, Ill.

[21] Appl. No.: 584,931

[22] Filed: Feb. 29, 1984

[51] Int. Cl.$^4$ ............................................. G01P 3/42
[52] U.S. Cl. ........................................... 73/2; 73/116; 73/119 R; 324/166; 324/167; 324/173; 324/176; 324/179; 324/208
[58] Field of Search ............... 324/166, 167, 173, 176, 324/179, 208; 73/2, 116, 119 R

[56] References Cited

U.S. PATENT DOCUMENTS

| | | | |
|---|---|---|---|
| 2,887,654 | 5/1959 | Strassman et al. | 324/166 |
| 3,404,339 | 10/1968 | Mitchell | 324/173 |
| 3,983,480 | 9/1976 | Meserow et al. | 73/1 R |
| 4,138,642 | 2/1979 | Mohr | 324/173 |
| 4,225,006 | 9/1980 | Murray | 324/208 |
| 4,339,713 | 7/1982 | Kago et al. | 324/173 |
| 4,503,509 | 3/1985 | Becker et al. | 73/1 R |

FOREIGN PATENT DOCUMENTS 1180588  2/1970  United Kingdom ................ 324/173

OTHER PUBLICATIONS

*Elektor*, vol. 2, No. 9, pp. 916–920 (Sep. 1976).

Primary Examiner—Peter Chin
Attorney, Agent, or Firm—Lorusso & Loud

[57] ABSTRACT

A vehicle tachometer kit including a pick up coil that is adapted to be mounted on the outside of the vehicle's alternator to sense its rotating field without any disassembly. An induced signal in the coil from alternator field leakage provides the normal input to a user calibrated r.p.m. display driving circuit in the tachometer that can be calibrated for different alternators and drive pulley ratios without another tachometer by selectively applying a simulated input reference signal to the display driving circuit and adjusting the r.p.m. display until a scheduled ratio is achieved between the displayed r.p.m. and the reference signal.

14 Claims, 4 Drawing Figures

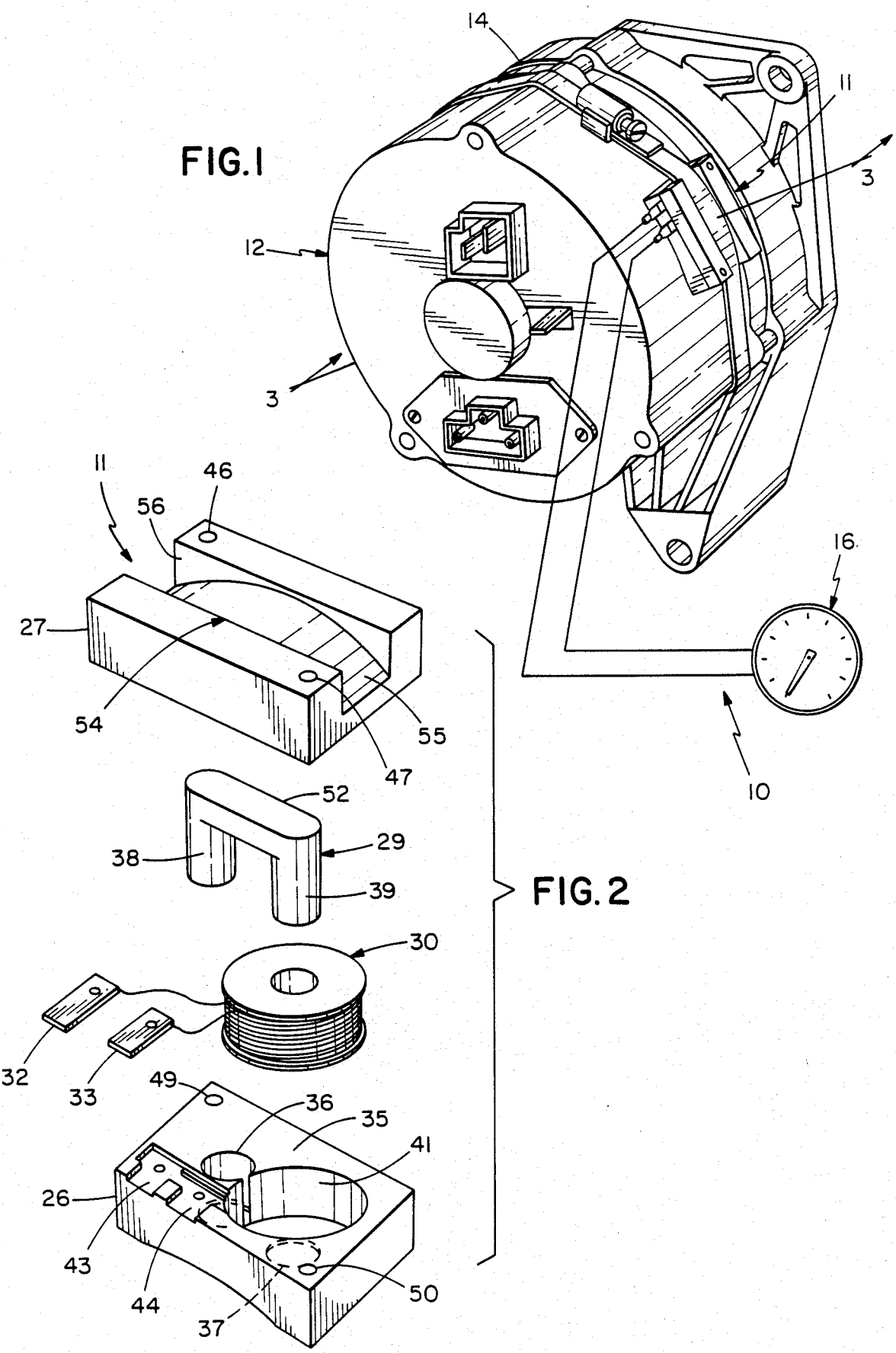

4,732,034

1

TACHOMETER KIT WITH ALTERNATOR PICK UP

BACKGROUND OF THE PRESENT INVENTION

Vehicular tachometers designed for installation after the sale of the original vehicle are usually tapped into the ignition system to locate an input signal that represents actual engine r.p.m. A convenient location in the past has been to tap into the vehicle alternator because the AC signal produced by the alternator is a logical signal source to drive an electronic tachometer. This signal source has been used almost throughout the last decade until recently when most alternator manufacturers no longer exposed the connectors for the alternator AC output signal but instead buried these connectors within the housing of the alternator making it impossible, or practically impossible, for the aftermarket purchaser to tap into this signal inside the alternator, because disassembly of the alternator by a professional mechanic to obtain this signal source is costwise prohibitive and unwise for the vehicle owner to attempt himself.

There has been at least one contemporary, but not admittedly prior, attempt to solve this problem imposed by modern-day alternator manufacturers, and this has taken the form of a single core-piece pick up coil strapped to the exterior of the alternator by a clamping strap with the coil mounted in a U-shaped bracket without any enclosing housing. This pick up coil, while not requiring the disassembly of the alternator, is difficult to attach to the alternator exterior and vehicle vibration frequently causes shifting of the coil from the primary flux leakage path around the alternator armature laminations. Furthermore, the open style of this pick up coil renders it very susceptible to damage from entry of foreign material which eventually degrades the quality of the signal from the coil.

Tachometer calibration has always been a difficult problem in aftermarket designed tachometer kits because the ratio of input signal to actual engine r.p.m. varies widely from vehicle to vehicle. When this input signal is derived from a pick up coil on the exterior of the alternator armature laminations, the input signal frequency varies not only as a function of the number of field poles on the rotor but also as a function of the ratio of the alternator pulley diameter to the crank pulley diameter. In today's on the road vehicles the alternator poles usually vary between four and sixteen, and crank to alternator pulley ratios vary between one and three so that it can easily be seen that the permutation of alternator pole number and pulley ratio yields a wide variety of engine r.p.m. to input signal frequency ratios that must be accommodated in the design of a market-acceptable aftermarket tachometer kit.

The usual method of calibrating tachometers is simply to provide an adjustable potentiometer in the tachometer driving circuitry (for electrical tachometers) that is used in conjunction with a second speed-sensing instrument such as a stroboscope or another tachometer. The new tachometer is adjusted after installation with the engine running until it reads the same as the other instrument and then checked at several different r.p.m.'s for linearity. This of course usually requires the user have expensive instrumentation, or if not, he must use a professional mechanic for installation.

It has also been proposed that a resonant reed be incorporated in the tachometer, driven during calibration by one of the ignition wires, but this is a costly method and produces high voltage transients unacceptable in today's solid-state tachometer driving circuits.

It is the primary object of the present invention to provide a tachometer kit that can be user-calibrated, and includes an improved alternator leakage flux sensing pick up.

SUMMARY OF THE PRESENT INVENTION

In accordance with the present invention, a tachometer kit is provided with an improved pick up coil unit easily connected to the outside of an engine-driven alternator that senses field leakage flux without requiring any alternator disassembly, and a tachometer instrument that can be easily calibrated by the user without any additional instruments using a manufacturer-provided calibration display r.p.m. chart. The improved pick up coil unit includes an enclosing plastic housing that can be accurately located over the alternator armature laminations without changing position during use, and which permits a U-shaped core-piece and coil to be totally encased and sealed from exposure to foreign matter. The calibration chart provides the user with a tachometer display r.p.m. for most combinations of alternator pole numbers and alternator pulley diameter and the user simply turns a calibration screw on the rear of the tachometer until the display shows the charted r.p.m. for his alternator drive pulley ratio, and the tachometer is thus properly calibrated without any engine derived signal whatsoever.

Toward these ends the present pick up coil unit includes the U-shaped core-piece with a coil surrounding one of the core-piece legs. The core-piece is ferrite and is housed with the coil and terminals in a two-piece clam shell plastic housing, preferably constructed of a durable, impact-resistant plastic such as nylon or delryn. The lower plastic housing portion has spaced bores that receive the legs of the ferrite core-piece and expose the ends of the legs to the alternator armature laminations at an arcuate housing mounting surface that engages the exterior of the alternator housing. A counterbore around one housing bore receives the coil, which is a spool with copper wire windings, surrounds one leg of the ferrite core-piece. The upper housing member has a recess that receives the "bite" portion of the ferrite core-piece, and it has an arcuate recess in its top surface that receives a clamping strap that extends completely around the alternator to hold the pick up coil housing firmly in place on the alternator. This clam shell housing not only prevents the entry of foreign material into the coil and ferrite core-piece but also provides increased sensitivity to leakage flux from the alternator's rotating field. This construction enables leakage flux from the rotating field of the alternator to induce a sufficient signal in the pick up coil even at zero power output from the alternator.

The tachometer itself has a built-in printed circuit board control circuit that includes an input signal conditioning circuit, an air-core gauge display driving circuit, a power supply and a calibration circuit associated with the air-core gauge driving circuitry.

Air-core gauges (sometimes referred to as bi-torque gauges) have been known for at least the last decade and generally include an electronic circuit that develops driving signals for two orthogonally related coils that produce a resultant mmf vector that angularly positions a magnet-carrying pointer linearly with respect to input signal frequency. Such an air-core gauge is shown in the Baker U.S. Pat. No. 3,946,311, assigned to the assignee of the present invention and reference should be made thereto for a more complete description of the general structure of air-core gauges.

The air-core gauge driving circuit includes an integrated circuit that basically is a function generator for developing drive signals for the air-core drive coils in response to input signal frequency. One integrated circuit that has been found acceptable for this purpose is the Cherry Semiconductor of Rhode Island, U.S.A. IC CS-189 and generally includes a charge pump for integrating the input signal and a function generator.

The calibration circuitry includes a reference signal generator that is selectively applied to the input of the integrated circuit during the calibration process. This reference signal is calibrated to a DC level at the manufacturer to represent at the input of the IC a predetermined input signal frequency, such as 400 Hz. The present calibration method is keyed to the principle that knowing the numerical ratio between actual engine r.p.m. and input signal frequency and knowing the equivalent input frequency of the reference signal, that the instrument r.p.m. displayed can be adjusted during calibration to specific r.p.m. with the reference signal as the input to achieve the same ratio between displayed r.p.m. and equivalent reference signal frequency. This produces accurate calibration because the instrument is linear.

The chart supplied by the manufacturer is simply a list of display r.p.m.'s to achieve this ratio equation for each of four, eight, ten, twelve, fourteen and sixteen pole alternators subdivided by pulley ratios, i.e. crankshaft pulley diameter to alternator pulley diameter, in decimal increments between one and three. For a given combination of pulley ratio, and alternator pole number, the pickup input frequency at 6000 r.p.m. may be calculated and charted, and this yields the engine r.p.m. to input frequency ratio. For example, with a four-pole alternator and a pulley ratio of two, the input signal frequency is 400 Hz. at 6000 engine r.p.m. and this yields an engine r.p.m. to input signal frequency ratio of fifteen. This ratio does not specifically have to appear on the chart, however. Assuming the DC reference signal to be 400 Hz. equivalent (it can be another value), then the self-calibration display r.p.m. is 6000 and this information is charted next to the pulley ratio and alternator pole information. The calibration circuit includes a plurality of parallel connected resistors and a potentiometer that enable the sensitivity of the driving circuit to be adjusted in four ranges to accommodate the wide variety of alternators and pulley ratios.

During calibration of the tachometer with the above exemplary four-pole and pulley ratio=2 combination, the user after rotating a switch to select the appropriate range resistor also listed on the chart, turns another switch to a calibration mode that connects the reference signal to the IC input and then adjusts the variable potentiometer until the instrument reads 6000 r.p.m., and the calibration process is completed by turning the switch back to reconnect the pick up coil to input, without the need for any external instrumentation or testing and without the need for any ignition system derived input signal. The same calibration circuit can however, when desired, be used with external instrumentation to calibrate the tachometer.

BRIEF DESCRIPTION OF THE DRAWINGS

FIG. 1 is a perspective view of an alternator with the present pick up coil unit strapped thereto and with the tachometer shown in schematic form;

FIG. 2 is a perspective exploded view of the present pick up coil unit;

DETAILED DESCRIPTION OF THE PREFERRED EMBODIMENT

Figure 3:
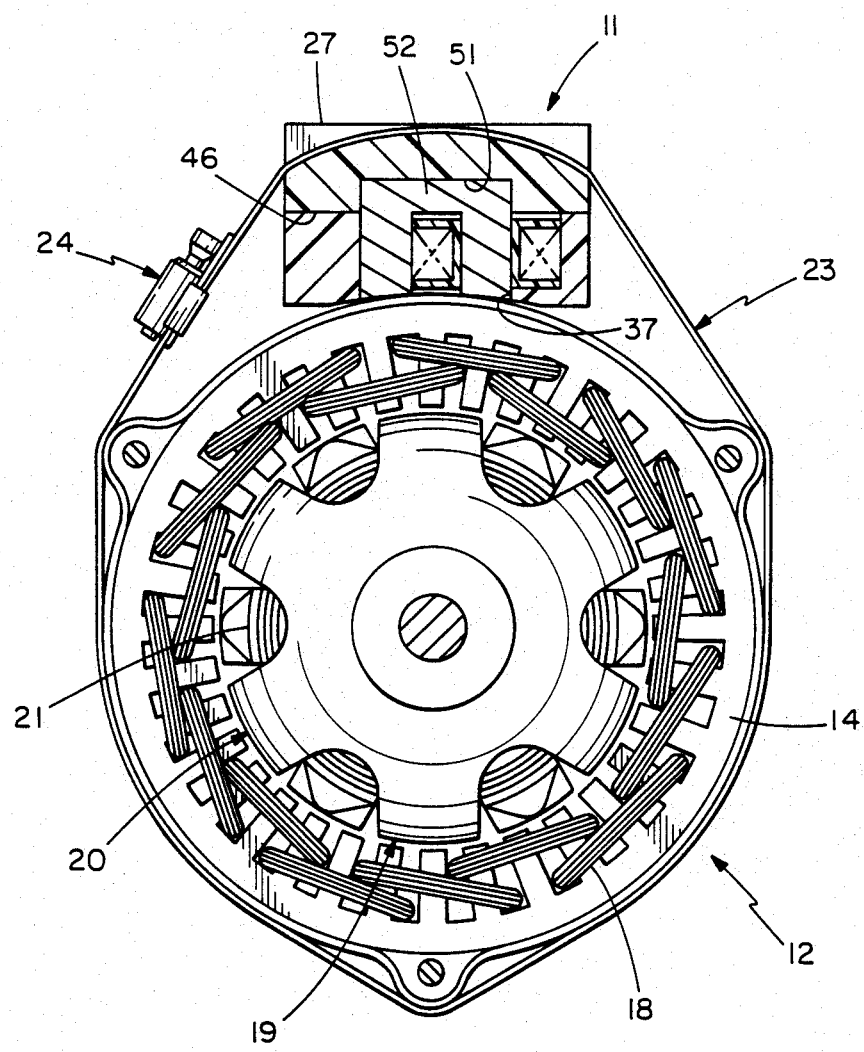
FIG. 3 is a cross-section taken generally along line 3—3 of FIG. 1 illustrating the alternator stator and armature as well as the core-piece and coil of the pick up coil.

Referring to the drawings and particularly FIGS. 1 to 3, a tachometer kit 10 is illustrated according to the present invention generally including a pick up coil unit 11 strapped around alternator 12 over alternator armature laminations 14, and a tachometer 16 adapted to be mounted within the interior of the vehicle visible to the operator at all times. The tachometer 16 is an air-core gauge of the type having orthogonally related drive coils that when driven by appropriate signals provide a field having a resultant mmf vector that rotates a magnet carrying pointer to angular positions linear with respect to the frequency of an input signal. Such an air-core gauge is disclosed in the Baker U.S. Pat. No. 3,946,311 referred to above. The tachometer 16 includes a printed circuit board containing a control circuit for the tachometer illustrated schematically in FIG. 4.

The alternator 12 by itself is conventional and as seen in FIG. 3 includes a laminated armature core 14 with armature windings 18 and a rotor 19 having six field poles 20 and field windings 21. While the alternator 12 has six field poles it should be understood that the present tachometer kit can be utilized with and calibrated to accommodate a plurality of standard alternators having between four and sixteen field poles.

The pick up coil unit 11 is preferably held directly over the armature core 14 where leakage flux from the field poles 20 is the highest in terms of the axial position of the pick up unit. A stainless steel strap 23 with a tensioning screw coupling 24 is provided for holding the pick up unit 11 in position on the exterior of the alternator 12.

As seen clearly in FIGS. 2 and 3, the pick up unit 11 generally includes a lower plastic housing member 26, an upper plastic housing member 27, a U-shaped ferrite core-piece 29 impaled over a coil spool 30 and terminals 32 and 33.

The housing members 26 and 27 are constructed of a durable petroleum resistant plastic such as delryn or nylon, and as seen in FIG. 2 the lower housing member 26 is rectangular in configuration with a flat upper surface 35 having adjacent through-bores 36 and 37 therethrough that receive cylindrical core-piece legs 38 and 39 respectively exposing the distal ends of the core-piece legs 38 and 39 for engagement or near-engagement with the periphery of the alternator laminations 14.

An enlarged counterbore 41 is formed around bore 37 and it receives and holds coil spool 30 in position as seen clearly in FIGS. 2 and 3.

The upper surface 35 of housing member 26 has a pair of shallow recesses 43 and 44 therein complementary to terminals 32 and 33 to hold them in position when clamped therein by flat lower surface 46 on the upper housing member 27.

The upper housing member 27 is also generally rectangular in configuration and includes a pair of diagonally arranged through bores 46 and 47 that are aligned with threaded bores 49 and 50 in lower housing member 26 that together receive threaded fasteners for holding the housing members 26 and 27 together in clam shell fashion against the core-piece 29, coil 30 and terminals 32 and 33. The lower flat surface 46 of the upper housing member 27 has a recess 51 therein that is complementary to and receives core-piece cross portion 52.

The upper surface of the upper housing member 27 has a longitudinal recess 54 therein with a convex arcuate lower surface 55 engaged by the strap 23 and sidewalls 56 that engage the sides of the strap 23 to prevent twisting movement of the coil unit 11. The arcuate recess surface 55 also prevents any sharp bending or crimping of the strap 23.

The clam shell housing members 26 and 27 locate internal parts accurately in position and facilitate simple assembly of the coil unit 11, and also permit disassembly for replacement or repair of any of the internal parts.

Figure 4:
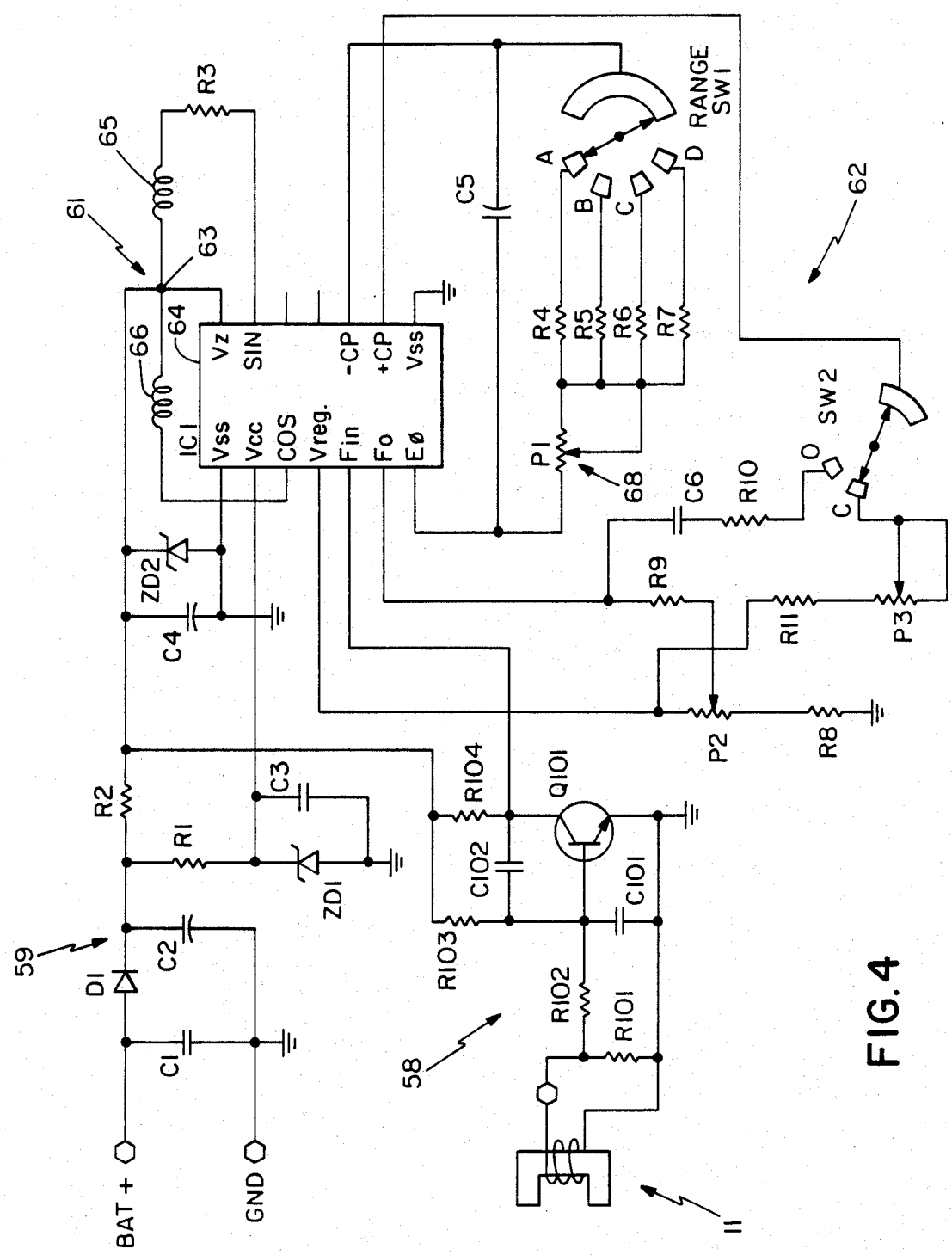
FIG. 4 is a schematic diagram of the present tachometer control circuit included in the calibration circuit.

The control circuit for the tachometer 16 is illustrated in schematic form in FIG. 4 and the entire circuitry illustrated with the exception of pick up coil unit 11 is mounted on a printed circuit board carried in the tachometer 16. This control circuit generally includes four functional blocks consisting of an input signal conditioning circuit 58, a power supply 59, an air-core gauge driver 61 and calibration circuitry 62.

As the alternator 12 rotates, leakage flux from the rotating field induces a voltage in the coil having a frequency dependent upon the number of field rotor poles 20, the pulley ratio between the crank pulley and the alternator pulley, and most importantly upon the vehicle crankshaft r.p.m.

In the signal conditioning circuit 58 resistor R-101 provides minimal loading to the pick up coil 11, and this improves the input wave shape and a low pass filter consisting of resistor 102 and capacitor 101 as well as an integrating capacitor C-102 further improve the input signal. The low pass filter output is amplified by transistor Q-101 and applied to the input of air-core gauge driver circuit 61 at pin 10 of integrated circuit IC-1.

The power supply for power supply circuit 59 is provided by the electrical system of the vehicle, namely the storage battery and alternator. Because of wide voltage variations and high voltage transients as well as EMI encountered in the vehicle's power bus, some further refinement of the power supply is required for application to the driver 61 and hence the need for power supply circuit 59. Capacitor C-1 is provided for high-frequency EMI by-pass and diode D-1 protects the circuit from negative transients and reverse voltage. Capacitor C-2 integrates the positive going transients and resistor R-1, zener diode ZD-2 and capacitor C-4 provide a 5.4 regulated reference voltage for the integrated circuit driver IC-1 at driver coil junction 63 and $V_z$ supply pin 64 on IC-1.

The integrated circuit IC-1 provides two level DC signals at pins 2 and 12 applied to air-core driving coils 65 and 66 in response to the frequency of the input signal applied by the signal conditioning circuit 58 at pin 11.

The integrated circuit IC-1 is conventional absent the external wiring shown in FIG. 4 and an exemplary IC circuit found acceptable for this purpose is CS-189 manufactured by Cherry Semiconductor of Rhode Island, and generally includes a comparator and charge pump circuit between pins 5 and 6 and pin 8 (out) for frequency to voltage conversion, a shunt regulator in part for stable operation at pin 11, and an internal function generator driven by the charge pump that drives sine and cosine amplifiers having their outputs at pins 2 and 12 respectively.

The input signal at pin 10 is buffered through an internal transistor in IC-1 and exits pin 9 for application to pin 6 and an internal input comparator in the charge pump circuitry. The charge that appears on capacitor C-6 is reflected to capacitor C-5 through a Norton amplifier. The input signal at pin 10 charges and discharges capacitor C-6 through resistor R-10. The capacitor C-5 reflects the charge as a voltage across a variable resistor calibration circuit 68. The output voltage $E_0$ as a function of the frequency of the input signal at pin 10 is determined by the equation $E_0$ (pin 8)$=K+[$input signal frequency$\times C_6 \times R_{68}$ ($V_{reg}$) pin 11)$-M)]$ where K and M are constants.

The function generator and sine and cosine amplifiers in IC-1 are driven by the on chip amplifier comparator circuitry. The voltage $E_0$ is compared in a divider network by the function generator circuitry and an external zener reference at pin 1 allows both sine and cosine amplifiers to swing positive and negative with respect to this reference. The function generator essentially picks off quasi sine and cosine values from saw-tooth waveforms phased 90 degrees with respect to one another to derive DC signals at pins 2 and 12 to drive coils 65 and 66 to provide a resultant flux mmf vector having direction from its zero position proportional to the frequency at pin 10.

The calibration circuitry 62 selectively applies a DC reference voltage at pin 6 to charge capacitor C-5 and produces drive signals at pins 2 and 12 linear with respect to the DC level of the signal, and this capability is utilized in the calibration process according to the present invention.

Calibration is effected by selecting one of the parallel resistors R-4, R-5, R-6 and R-7 in conjunction with switch SW-1 and adjusting variable potentiometer P-1. Both potentiometer P1 and range selection switch SW-1 are accessible by adjustable screws in the rear of the tachometer 16.

The tachometer is calibrated by selectively applying a regulated voltage source at pin 11 to the comparator input at pin 6 with two-position calibration switch SW-2 in position C. Switch SW-2 is also accessible to the user at the rear of the tachometer 10. A high resistance value is given to this reference voltage by resistor R-11 and potentiometer P-3, the latter of which is adjusted at the factory to calibrate the reference voltage. For a given setting of calibration potentiometer P-1 and a selection of one of the calibration range resistors R-4, R-5, R-6 and R-7 the reference current is adjusted at the factory by potentiometer P-3 to give a full scale reading on the tachometer. This reference is switched to comparator input pin 6 instead of the charge of capacitor C-6 via switch SW-2 at the initiation of the calibration process.

The calibration method is based upon a manufacturer tabulated chart that tells the user what r.p.m. reading he must drive the tachometer to for his vehicle by range switch SW-1 and potentiometer P-1 with switch 2 in the calibrate position for the number of alternator poles and the pulley ratio between alternator and crankshaft pulley. The following is an example of such a chart for a four-pole alternator and similar charts can be developed for eight, ten, twelve, fourteen and sixteen-pole alternators to complete the chart provided each user-purchaser with the present tachometer kit.

| | FOUR ALTERNATOR POLES | | |
|---|---|---|---|
| RATIO | CAL SWITCH POS | 6000 RPM HZ | SELF-CAL RPM |
| 1 | A | 200 | — |
| 1.1 | A/B | 220 | — |
| 1.2 | B | 240 | — |
| 1.3 | B | 260 | — |
| 1.4 | B | 280 | — |
| 1.5 | B | 300 | — |
| 1.6 | B/C | 320 | — |
| 1.7 | C | 340 | — |
| 1.8 | C | 360 | — |
| 1.9 | C | 380 | — |
| 2 | C | 400 | 6000 |
| 2.1 | C | 420 | 5710 |
| 2.2 | C | 440 | 5450 |
| 2.3 | C | 460 | 5220 |
| 2.4 | C | 480 | 5000 |
| 2.5 | C | 500 | 4800 |
| 2.6 | C | 520 | 4620 |
| 2.7 | C | 540 | 4440 |
| 2.8 | C/D | 560 | 4290 |
| 2.9 | C/D | 580 | 4140 |
| 3 | D | 600 | 4000 |

As noted above the present calibration method tells the user to adjust the tachometer reading during the calibration process so that the ratio between the calibrated r.p.m. shown on the instrument to the reference voltage is equal to the ratio between engine r.p.m. and input signal frequency from the transducer 11. This ratio is easily determined by the number of alternator poles and the pulley ratio and since the reference voltage is known and the instrument is linear, the instrument calibration r.p.m. is also easily determined. The pulley ratio is the crank pulley diameter to alternator pulley diameter. For example, as seen in the above chart, a four-pole alternator having a pulley ratio of two produces an input signal at pick up 11 of 400 Hz. at 6000 r.p.m. yielding a ratio of 15. This ratio of 15 at a given reference voltage at switch SW-2 (C), for example $V_{ref}$=DC equivalent of 400 Hz. at pin 6, fixes the calibration r.p.m. at 6000 as shown in the right column in the above chart.

With this same pulley ratio and four pole alternator, the user after installing the pick up unit 11 and connecting supply to the input of the power supply circuit 59 shifts switch SW-2 to the calibrate position and range switch SW-1 to contact C, and then simply adjusts P-1 until the instrument reads 6000. This completes the entire calibration process very easily and the user then switches switch SW-2 back to the "operate" position so that the input at pin 10 is the pick up 11. This enables the tachometer, if desired, to be calibrated without any other instrumentation and without any input signal from the vehicle's electrical system other than the power supply.

I claim:

1. An electrically driven uncalibrated vehicular tachometer that may be calibrated by the user to accommodate a variety of standard alternators from which a tachometer input signal is derived, comprising: a pick up coil transducer adapted to be fixed to the exterior of the alternator and sense the rotating field of the alternator rotor and provide an input signal representing engine rpm, a tachometer instrument having an input adapted to receive the input signal, a visual display, a visual display driving circuit for deriving drive signals for the visual display, a calibration circuit between the input and the display driving circuit adjustable from the exterior of the tachometer for varying the response of the display driving circuit to signals at the input, a reference signal generator in and part of the tachometer for deriving a fixed reference signal representing a predetermined input signal and corresponding engine rpm, switch means accessible from the exterior of the tachometer for selectively connecting the reference signal to the input, means for determining a plurality of specific visual display calibration rpm's for the engine rpm represented by the same reference signal for a variety of alternator derived input signal to engine rpm ratios, and means for varying the calibration circuit with the same reference signal connected to the input to produce more than one of the display rpm's from the determining means for the corresponding input signal to engine rpm ratio desired, said switch means being operable to disconnect the reference signal from the input and connect the input signal thereto after calibration is complete.

2. An electrically driven vehicular tachometer as defined in claim 1, wherein the calibration circuit includes a plurality of parallel resistive elements, and a range switch for selecting any one of said resistive elements to control the response of the display driving circuit to the signal at the input to accommodate alternators with different numbers of field poles and a variety of pulley ratios between the engine and the alternator.

3. An electrically driven vehicular tachometer as defined in claim 1, wherein the tachometer is an air core instrument having at least two coils for a deflectable visual indicator, said visual display driving circuit including a function generator for deriving driving signals by sampling out of phase signals for application to the two coils.

4. A vehicular user calibrated tachometer that is previously uncalibrated having a display driving circuit for deriving a signal to drive a visual display in linear response to an input signal representing engine rpm in a manner to accommodate a variety of input signal to engine rpm ratios, comprising: means for readily determining a plurality of specific display rpm's for a given specific input signal for a variety of input signal to engine rpm ratios, an input for receiving the input signal and applying it to the display driving circuit, an rpm display driven by the display driving circuit, means in and part of the tachometer for generating a reference signal equal to the given specific input signal, means in the tachometer for selectively disconnecting the engine rpm input signal from the input and connecting the reference signal to the input, and means in the tachometer for varying the response of the visual display driving circuit to the signal at the input when the same reference signal is connected to the input so that the display can be adjusted to more than one of the rpm's determined by the means for determining a plurality of specific display rpm's to thereby accommodate the ratio of input signal to engine rpm for a variety of vehicles.

5. A user calibrated tachometer as defined in claim 4, including a transducer for sensing engine alternator field rotation and generating said input signal therefrom, said means for varying the linear response of the display driving circuit to the input signal including a plurality of impedance components connected in parallel and a range selection switch for selecting one of the impedance components to accommodate a plurality of alternators having different numbers of field poles.

6. A user calibrated tachometer as defined in claim 4, wherein the tachometer is an air core instrument having at least two coils for a deflectable visual indicator, said visual display driving circuit including a function generator for generating DC signals representing sampled values of two out of phase signals for application to the two coils.

7. A user calibrated tachometer as defined in claim 4, wherein the means for disconnecting the engine rpm input signal from the input and connecting the reference signal thereto includes a switch operable from the exterior of the tachometer, means for calibrating the reference signal inaccessible from the exterior of the tachometer, and a pick up transducer for sensing the rotating field of an associated engine alternator and deriving said engine rpm input signal, said switch being operable to reconnect the engine rpm input signal to the input.

8. A vehicular user calibrated tachometer as defined in claim 4, wherein the means for generating a reference signal includes means for selectively generating at least two reference signals equal to two specific input signals to accommodate a wider variety of vehicles.

9. A user calibrated tachometer kit having a previously uncalibrated tachometer and an input signal pick-up device adapted to be mounted externally on an alternator, designed to be calibrated by the user to accommodate a variety of alternator pulley ratios and alternator pole numbers, comprising: means for readily determining a plurality of specific display rpm's for a variety of combinations of alternator pole number and pulley ratios which correspond to a given specific input signal, an alternator pick-up for sensing the rotating magnetic field of the alternator rotor and deriving an input signal, a tachometer including an input for receiving the input signal and applying it to a display driving circuit, an rpm display in the tachometer driven by the display driving circuit, means in and part of the tachometer for generating a reference signal equal to the given specific input signal, means in the tachometer for selectively disconnecting the alternator pick-up input signal from the input and connecting the reference signal to the input, and means in the tachometer for varying the response of the visual display driving circuit to the signal at the input when the same reference signal is connected to the input so that the display can be adjusted to the more than one of the rpm's determined by the means for determining a plurality of specific display rpm's to thereby accommodate the ratio of alternator field frequency to engine rpm for a variety of vehicles.

10. A tachometer kit as defined in claim 9, wherein the pick-up includes a plastic housing, a ferro-magnetic core piece mounted generally transversely in the housing, a coil in the housing surrounding at least part of the core piece to carry an induced voltage from flux in the core piece, a longitudinally extending recess in the top of the housing, and a strap extending across the top of the housing in the recess adapted to surround the alternator and hold the transducer against the exterior of the alternator, and a tachometer readout adapted to receive signals from the coil representing engine rpm and provide a visual indication of engine speed.

11. A tachometer kit as defined in claim 10, wherein the core piece is "U" shaped in configuration with the legs of the "U" shaped core piece extending generally radially inwardly with respect to the alternator.

12. A tachometer kit as defined in claim 10, wherein the housing includes separable top and bottom portions, said bottom portion having a first bore therethrough for receiving one leg of the core piece and a second bore therethrough for receiving the other leg of the core piece, one of said bores including an enlarged counterbore portion for receiving and supporting the coil.

13. A tachometer kit as defined in claim 12, including a recess in the top portion of the housing to receive an upper portion of the core piece.

14. A tachometer kit as defined in claim 10, wherein the housing has a lower arcuate surface engaging and substantially conforming to the outer surface of the alternator.

* * * * *